United States Patent Office 3,527,582
Patented Sept. 8, 1970

3,527,582
REVERSIBLE GELATIN OF LIQUID HYDROCARBON FUELS
Daniel H. Haigh, Beaverton, and Richard H. Hall and William E. Cohrs, Midland, Mich., assignors to The Dow Chemical Company, Midland, Mich., a corporation of Delaware
No Drawing. Filed May 26, 1967, Ser. No. 641,450
Int. Cl. C10l 1/10
U.S. Cl. 44—56                                    4 Claims

ABSTRACT OF THE DISCLOSURE

The method concerns converting a gelled or thickened normally liquid hydrocarbon fuel into an easily pumpable liquid fuel by intimately incorporating therewith an effective amount of a polar compound, the fuel containing as a gelling or thickening agent a crosslinked latex polymer of an alkylstyrene. The method is useful for reducing aircraft fire hazards due to fuel tank rupture and ignition.

---

This invention concerns a method and agents for converting gels of normally liquid hydrocarbons to liquids suitable for use as fuels in aircraft or turbine engines.

Considerable attention is currently being focused on controlling the flammability of aircraft or turbine fuels in order to significantly reduce aircraft fire hazards and catastrophic combustion caused by fuel tank rupture and ignition such as, for example, by crashes. A significant number of military and civilian aircraft fatalities are due to fire and not to the crash itself.

Two potential techniques for preventing and controlling aircraft fires involve the use of gelled and emulsified fuels which will not readily burn in many situations where unmodified aircraft or turbine fuels will. When the thickened fuels do ignite, they burn more slowly and far less intensively than the unmodified fuels.

The principle in both approaches is essentially the same. Both methods seek to bind extremely small droplets of fuel physically in a semi-solid envelope that will reduce the tendency to vaporize, spill and flow. This significantly curtails the amount of straight fuel and vapor available for ignition and uncontrolled combustion.

One approach to the thickened fuel concept is a gelling agent that could be injected into the aircraft fuel tanks if a crash were imminent, instantaneously changing the fuel into a solid. This approach has some major drawbacks: subject to human error; possible initiation by natural forces, and, once initiated, the aircraft has no fuel.

A different approach which shows some promise is the development of fuel gels and emulsions of a consistency that could be pumped into the aircraft fuel tanks and kept in this modified gel state until converted back into a liquid fuel, e.g. by the shear forces and heat encountered in passing through the fuel injector into the engine or combustion chamber.

This approach is not without problems either. One problem is getting the gelled or emulsified fuel to the engine. Another is the need for additional forces (other than that of the fuel injector itself) to break down the gel or emulsion at high altitude or under cold, ambient conditions. A further problem is lowered engine combustion efficiency if the gel or emulsion particles are not broken down to a small enough size. Still another problem is removing the contamination and dirt from gels and emulsions since these viscous fuels tend to clean out fuel lines and tanks and to hold in suspension contaminants which would normally settle out of liquid fuels. A further problem peculiar to emulsified fuels is the need for adding a biocidal agent to suppress the growth of algae and bacteria, as well as adding a corrosion inhibitor. Also the emulsified fuels containing water change viscosity under extremely cold conditions as well as reduce the effective amount of fuel in the tank.

It has now been found that gels of normally liquid hydrocarbon fuels, as hereinafter defined, can readily be converted into liquids suitable for use in aircraft, jet, or turbine engines by intimately incorporating into the gel a small but effective amount or proportion within the range of from about 0.1 to 5, preferably from 0.2 to 2, percent by weight of the gel of a polar solvent such as an aliphatic alcohol having from 1 to 12 carbon atoms, dimethyl sulfoxide, dimethyl formamide, dimethyl acetamide, or mono-, di-, or triethanolamines, and the like, or mixtures thereof.

The polymers of alkylstyrenes used as gelling or thickening agents in the practice of this invention are obtained by emulsion polymerization of alkylstyrene monomers which have alkyl groups containing from 3 to 20, preferably from 4 to 12, carbon atoms, and mixtures of styrene monomers containing an average of at least 3, and no more than 20, preferably from 4 to 12, aliphatic carbon atoms per aromatic ring. The emulsion polymerized alkylstyrene polymers include: homopolymers of tertiary-alkylstyrenes such as p-tertiary-butylstyrene, p-tertiary - amylstyrene, p-tertiary-hexylstyrene, p-tertiary-octyl styrene, p - tertiary - dodecylstyrene, p-tertiary-octadecylstyrene, and p-tertiary-eicosylstyrene; homopolymers of n - butylstyrene, n - amylstyrene, n-hexylstyrene, n-octylstyrene, n-dodecylstyrene, n-octadecylstyrene, and n-eicosylstyrene; homopolymers of sec-butylstyrene, sec-hexylstyrene, sec-octylstyrene, sec-dodecylstyrene, sec-octadecylstyrene, and sec-eicosylstyrene; homopolymers of isopropylstyrene, isobutylstyrene, isohexylstyrene, isooctylstyrene, isododecylstyrene, isooctadecylstyrene, and isoeicosylstyrene; and copolymers thereof, as well as copolymers of such alkylstyrenes with styrene and vinyl toluene, for example, such as: a copolymer of p-tertiary-butylstyrene and styrene in at least a 75:25 mole ratio, a copolymer of n-amylstyrene and styrene in at least a 60:40 mole ratio, a copolymer of n-hexylstyrene and styrene in at least a 50:50 mole ratio, a copolymer of sec-dodecylstyrene and styrene in at least a 25:75 mole ratio, a copolymer of isoeicosylstyrene and styrene in at least a 15:85 mole ratio; a copolymer of p-tertiary-butylstyrene and vinyl toluene in at least a 67:33 mole ratio, a copolymer of sec-amylstyrene and vinyl toluene in at least a 50:50 mole ratio, a copolymer of n-octylstyrene and vinyl toluene in at least a 29:71 mole ratio, a copolymer of n-dodecylstyrene and vinyl toluene in at least a 19:81 mole ratio, and a copolymer of sec-octadecylstyrene and vinyl toluene in at least a 12:88 mole ratio; and the like.

The amount of polymer to be used as a gellant or thickener for the liquid hydrocarbon fuel in the practice of this invention can normally range from about 1 to 10, and preferably from about 1.5 to 3, per cent by weight based on the total weight of the fuel and gellant or thickener. The actual amount needed will depend in part upon the polymer and on the type of hydrocarbon fuel used. The temperature limits operative in the practice of the invention will normally range from about −40° F. to +200° F.

It is important that the polymers used in the practice of the invention be crosslinked with a small amount of a crosslinging agent, preferably in the range of from about 0.05 to 0.2 percent by weight. Suitable crosslinking agents include polyethylenically unsaturated compounds such as divinylbenzene, diethyleneglycoldimethacrylate, diisopropenylbenzene, dissopropenyldiphenyl, disallylmaleate, diallylphthalate, or allylemethacrylate, as well as any other di- or polyfunctional compound known to be of use as a crosslinking agent in polymeric styrene compositions.

The concentration and type of emulsifier used in the emulsion polymerization of the latex polymers is important for latex stability as well as for fuel gelation efficiency. The emulsifier concentration can range from about 1 to 8, and preferably from about 2 to 3, percent by weight based on the monomer weight. Emulsifiers which can be used include any onionic surface active agent such as the ammonium, amine, and alkali metal salts of: sulfated fatty alcohols, alkyl aryl sulfonates, sulfated alkyl aryl polyethers, dialkyl esters of sulfosuccinic acid, alkyl sulfonates, N-methyl-N-oleyl taurate, and the like. Among specific emulsifiers are ammonium lauryl sulfate, amine oleyl sulfate, sodium lauryl sulfate, sodium octyl/decyl sulfate, dihexyl- and dioctyl esters of sodium sulfosuccinic acid, dodecyl sodium sulfonate, oleic acid ester of sodium isethionate, and dodecyl benzene sodium sulfonate.

The emulsifier appears to impart an ionic charge on the polymer particles, which charge influences the gelation efficiency as well as the reversibility of gelation, i.e. the presence of an ionic charge allows the gel structure to be broken by means of a polar compound.

It is important that the polymer be isolated or recovered from the latex or emulsion in admixture with at least a portion of the emulsifier, or without disturbing the ionic balance imparted by the emulsifier. The polymer can be recovered by spray drying, or tray drying, the latex at temperatures between about 20–200° C. The latex usually contains particles of sizes of about 1000 A. Spray drying (or tray drying followed by grinding) normally produces polymeric particles of irregular geometry having an average size of about 1–80 microns and in the form of a fine white powder.

In practice, a finely divided latex polymer of an alkylstyrene slightly crosslinked is intimately mixed into an aircraft type or turbine liquid hydrocarbon fuel with good agitation to form a gelled or thickened fuel. The gelled or thickened fuel is loaded into the fuel tank(s) of an aircraft. Suitable means such as a slightly pressurized system or an expulsion bladder or the like can be used to force the gelled or thickened fuel into a fuel feed pump. A controlled amount of a polar solvent is metered to the fuel feed pump and into admixture therein with the gel. On being mixed with the polar solvent, the gel structure breaks down, leaving an easily pumpable liquid fuel having a viscosity not unlike that of the fuel before gelation. Thereafter, conventional means can be used for moving the liquid fuel through the aircraft fuel system to the fuel injectors and thence to the aircraft or turbine engine combustion chamber.

Practice of the invention is not limited to use in aircraft or turbine engine fuel systems to reduce the fire hazard, but it can also be used to reduce the fire hazards in the bulk transportation by any means of gelled normally liquid hydrocarbon fuels with the subsequent breaking down of the gelled fuel structure as herein described, upon arrival at the distribution point.

The following non-limiting examples serve to illustrate the invention:

EXAMPLE I

Preparation of the latex polymer. The following recipe was used:

Water phase

Diluent: 450 ml. deionized water
Catalyst: 1.5 g. potassium persulfate
pH control: 1.5 g. sodium bicarbonate
Emulsifier: 17.0 g. mixture of sodium salts of octyl/ decyl sulfate (35% active) (actual emulsifier=2% based on monomer)

Oil phase

Monomer: 300 g. p-t-butylstyrene
Crosslinking agent: 0.8 g. divinylbenzene (52.9% active=0.14% based on monomer)

Procedure

A reaction vessel containing the deionized water was evacuated and purged with nitrogen followed by the addition of the catalyst and pH control, followed further by re-evacuation and nitrogen purging. The emulsifier was added followed by another evacuation and nitrogen purging. The temperature was raised to 60° C. and the monomer mixture was added continuously over a ten hour period. After completion of the monomer addition the temperature was held at 60° C. for one hour longer to insure substantially complete monomer conversion. The latex had the following properties:

Surface tension—68 dyness/cm.$_2$
Viscosity—25 cps.
Solids, percent—40
Particle size, avg. diam.—1000 A.

The polymer was isolated by spray drying the latex at 170° C. It was obtained in the form of a fine white powder having particles of sizes ranging from 1–80 microns.

EXAMPLE II

A gelled hydrocarbon fuel was prepared by mixing with good agitation 2.5% by weight of the latex polymer prepared in Example I into 97.5% by weight of JP-1 jet aircraft fuel (kerosene). The gelled fuel had a consistency like that of thin jello or thick mayonnaise. The tendency of the fuel to vaporize, spill and flow was greatly reduced. The gelled fuel was then introduced by means of a reservoir, large diameter plastic tube, and gravity feed into the inlet of a centrifugal pump. Pumping was begun with the simultaneous introducing into the gel at the pump inlet of one percent by weight of dimethyl sulfoxide.

The gel structure broke (by reversible gelation) resulting in liquid hydrocarbon fuel with a viscosity similar to that of the unmodified liquid fuel.

EXAMPLE III

A latex polymer material (2% by weight) similar to that prepared in Example I is mixed into JP-1 aircraft type fuel (kerosene) with good agitation to give a gelled fuel. This gelled fuel is then loaded into the fuel tank of an aircraft resulting in a greatly reduced aircraft fire hazard. A slightly pressurized system or expulsion bladder forces the gelled fuel into the suction opening of a fuel feed pump. A controlled small amount (0.2 percent by weight) of n-butyl alcohol is metered into the gelled fuel resulting in a liquid pumpable fuel.

EXAMPLE IV

A procedure similar to that described in Example III is followed except that: (a) 1.5% by weight of the latex polymer is mixed into the fuel to produce a gel; (b) the fuel is JP-4 jet aircraft type fuel (a kerosene-gasoline mixture); and (c) the polar solvent is dimethyl formamide. A liquid pumpable fuel results on metering a controlled small amount of dimethyl formamide into the gelled fuel.

EXAMPLE V

A procedure similar to that described in Example IV is followed except that: (a) 1.0% by weight of the latex polymer is mixed into the fuel to produce a thickened fuel; and (b) the polar solvent is methanol. A liquid pumpable fuel results on metering a controlled small amount (0.3 percent by weight) of methanol into the thickened fuel.

EXAMPLE VI

Latex polymers are prepared in a manner similar to that described in Example I except for using the following monomers and amounts thereof.

| Run | Monomer | Monomer wt., grams |
|---|---|---|
| 1 | p-tert-Butylstyrene plus Vinyl toluene | 220 80 |
| 2 | p-tert-Amylstyrene plus Vinyl toluene | 180 120 |
| 3 | p-tert-Butylstyrene plus Styrene | 250 50 |
| 4 | n-Amylstyrene plus Styrene | 215 85 |
| 5 | p-tert-Amylstyrene plus Styrene | 225 75 |
| 6 | n-Hexylstyrene plus Styrene | 195 105 |
| 7 | p-tert-Hexylstyrene plus Styrene | 200 100 |

Each of the latex polymers from runs 1 through 7 is used in a manner similar to that described in Example III except that the fuel is JP-4 jet aircraft type fuel. A controlled small amount (0.25 percent by weight) of n-butyl alcohol is metered into the gelled fuel resulting in a liquid pumpable fuel.

By using a latex polymeric gellant or thickener such as described herein, hydrocarbon fuels for all types of vehicles can be transported by any means such as by aircraft, truck, train, or ship, in bulk in the gelled or thickened state with greatly reduced fire hazard. At the destination point the gelled or thickened fuel can be converted into liquid fuel on demand by the reversible gelation technique described herein.

We claim:
1. A normally liquid hydrocarbon fuel, previously thickened or gelled with from about 1 to 10 percent by weight of a finely divided latex polymer of
   (1) from about 99.8 to 99.95 percent by weight of a p-tertiary alkylstyrene having from 3 to 20 carbon atoms in the alkyl group and
   (2) from about 0.05 to 0.2 percent by weight of a polyethylinically unsaturated compound, selected from the group consisting of divinyl aromatic hydrocarbons, diethylene glycol dimethacrylate, allyl methacrylate, and diallyl esters of maleic and phthalic acids, said latex polymer being in the form of particles of sizes ranging from about 1–80 microns, which additionally contains about 0.1 to 5 percent by weight of a polar compound selected from the group consisting of an aliphatic alcohol having from 1 to 12 carbon atoms, dimethyl sulfoxide, dimethyl formamide, dimethyl acetamide, a mono-, di-, or triethanolamine, and mixtures thereof.
2. The fuel of claim 1 wherein the latex polymer comprises a p-tertiary-alkylstyrene having from 3 to 20 carbon atoms in the alkyl group.
3. The fuel of claim 1 wherein the polyethylenically unsaturated compound is divinylbenzene.
4. The fuel of claim 1 wherein the latex polymer is obtained by drying a latex or aqueous emulsion containing from about 1 to 8 percent by weight based on the monomer weight of an anionic surface active agent as the emulsifier.

References Cited
UNITED STATES PATENTS 2,927,849   3/1960   Greblick et al. _____ 44—62

DANIEL E. WYMAN, Primary Examiner

Y. H. SMITH, Assistant Examiner

U.S. Cl. X.R.
44—62, 71, 72, 76